United States Patent [19]

Williams

[11] Patent Number: 5,609,100

[45] Date of Patent: Mar. 11, 1997

[54] FACE VALVE APPARATUS FOR CONTINUOUS MOTION CAN DECORATOR

[75] Inventor: Robert Williams, Randolph, N.J.

[73] Assignee: Sequa Corporation, Hackensack, N.J.

[21] Appl. No.: 476,595

[22] Filed: Jun. 7, 1995

[51] Int. Cl.$^6$ .................................................. B41F 17/22
[52] U.S. Cl. ..................... 101/40; 251/188; 137/625.11
[58] Field of Search ............................ 101/35, 39, 40, 101/40.1; 137/625.11, 625.12, 625.15; 251/172, 175, 187, 188, 192, 210

[56] References Cited

U.S. PATENT DOCUMENTS

| | | | |
|---|---|---|---|
| 2,578,160 | 12/1951 | Van Der Werff | 251/85 |
| 2,593,733 | 4/1952 | Davies | 251/105 |
| 2,964,061 | 12/1960 | Rawson et al. | 137/627 |
| 2,996,083 | 8/1961 | Huska | 137/625.11 |
| 3,040,777 | 6/1962 | Carson et al. | 137/625.15 |
| 3,131,605 | 5/1964 | La Borde . | |
| 3,198,004 | 8/1965 | Roberts et al. | 73/45.1 |
| 3,713,462 | 1/1973 | Bushee | 137/625.21 |
| 3,766,851 | 1/1973 | Sirvet et al. | 101/40 |
| 4,316,707 | 2/1982 | Hansen et al. | 137/625.21 |
| 4,509,555 | 4/1985 | Stirbis | 137/625.11 |
| 5,183,145 | 2/1993 | Williams et al. | 101/40 |

*Primary Examiner*—Ren Yan
*Attorney, Agent, or Firm*—Mitchell D. Bittman; Jerome M. Berliner

[57] ABSTRACT

Face valve apparatus having a plurality of valve stations each of which includes a replaceable pad that is behind and in contact with a planar face of a continuously moving valve section having a plurality of inlet ports in a circular array about a rotational axis for the movable valve section. Each of the valve stations are removably mounted to a fixed support by a plurality of fasteners that are accessible for operation from behind the support. Each pad defines an inlet port disposed in front of said support and operatively positioned so that for part of each revolution fo the movable valve section, each of the inlet ports communicates directly with the outlet port. When operation of certain of the fasteners releases a selected valve station from the fixed support, the selected valve station is removable from the support through an opening therein so that the pad is rearward of the support, where such pad is accessible for replacement without disturbing mounting of any of the other valve stations to the fixed support.

12 Claims, 6 Drawing Sheets

FACE VALVE APPARATUS FOR CONTINUOUS MOTION CAN DECORATOR

BACKGROUND OF THE INVENTION

This invention relates to face valve apparatus in general, and relates particularly to face valve apparatus incorporated in high speed continuous motion equipment for decorating beverage cans.

Today it is not unusual for continuous motion high speed apparatus to decorate 1,500 beverage cans per minute. Examples of this type of apparatus are disclosed in U.S. Pat. Nos. 3,766,851, 5,111,742 and 5,183,145. U.S. Pat. No. 3,766,851 issued Oct. 23, 1973 to E. Sirvet, J. Skrypek and E. Whelan for a Continuous Can Printer and Handling Apparatus, U.S. Pat. No. 5,111,742 issued May 12, 1992 to R. DiDonato and E. Sirvet for A Mandrel Trip Subassembly For Continuous Motion Decorators, and U.S. Pat. No. 5,183,145 issued Feb. 2, 1993 to R. Williams, E. Sirvet and R. Gabel for Apparatus and Method For Automatically Positioning Valve Means Controlling the Application of Pressurized Air to Mandrels on a Rotating Carrier.

In such continuous motion decorators, undecorated cans are loaded on mandrels that are mounted on a continuously rotating mandrel wheel near the periphery thereof. For each mandrel, vacuum or high pressure air is applied thereto for selected angular positions thereof. That is, vacuum is applied to load a can on the mandrel and to hold the can on the mandrel while decorations are applied to the can and varnish is applied over the decorations. High pressure air is applied to unload a can from a mandrel either after varnish is applied or before decorations can be applied when misloading of a can is detected.

To control the application of vacuum and high pressure air to the mandrel and obtain the foregoing operation, it has been found to be convenient to utilize face valve apparatus having a minimum of four relatively stationary stations that interface with a single continuously rotating ring shaped plate having a plurality of inlet ports that extend to a flat face thereof, with such face being perpendicular to the rotational axis for the plate. Conduits on the mandrel wheel connect each of the inlet ports to an individual one of the mandrels. Each of the stationary stations includes an outlet port that is defined by a wear pad which is biased against the face. Since the pad material is softer than the face material and the face is rotating at high speed, the pads are subjected to wear and must be replaced periodically.

In the prior art, replacement of even a single pad was a time consuming operation because all of the stationary stations were mounted on a common support plate which had to be dismounted from the machine frame in order to gain access to a damaged or worn pad to replace same. Further, in order to reduce the relative speed between the face of the rotating plate and the stationary wear pads engaged therewith, the latter were positioned relatively close to the rotational axis of the rotating plate. Because of this, the stationary stations were closely grouped in a confined area of the decorator. Even though somewhat flexible hoses are used to feed working air (air pressurized either substantially above or below ambient) to the stationary stations, because the hoses were close together, they formed a relatively stiff group of hoses. As a result, to gain access to a worn pad it was also necessary to detach and reconnect many, if not all, attachments between the hoses and the stations.

SUMMARY OF THE INVENTION

In accordance with the instant invention, face valve apparatus comprising a continuously rotating plate section and a stationary section with a plurality of stations each including a wear pad biased against the face of the plate section, is constructed so as to facilitate replacement of the wear pads. This is achieved by mounting the plurality of stations on a common stationary support in such a way that each station is an assembly that can be mounted and dismounted individually without disturbing any of the other stations and without dismounting the common support. The result is that it is not necessary to disconnect and reconnect hose connections feeding the other stations and pressure settings for the other stations need not be reset.

Accordingly, the primary object of this invention is to provide an improved construction for face valve apparatus having a plurality of relatively fixed stations on a fixed common support.

Another object is to provide an improved construction of this type in which individual stations may be dismounted from and remounted on the common support without disturbing mounting of the common support and without disturbing any of the other stations.

Still another object is to provide an improved construction of this type in which individual stations may be dismounted from and remounted to the common support without disconnecting the vacuum/high pressure hoses feeding any of those stations that are not dismounted from the common support.

Yet another object is to provide improved face valve apparatus adapted especially for high speed continuous motion can decorators.

BRIEF DESCRIPTION OF THE DRAWINGS

These objects as well as other objects of this invention shall become readily apparent after reading the following description of the accompanying drawings in which.

DETAILED DESCRIPTION OF THE DRAWINGS

Figure 1:
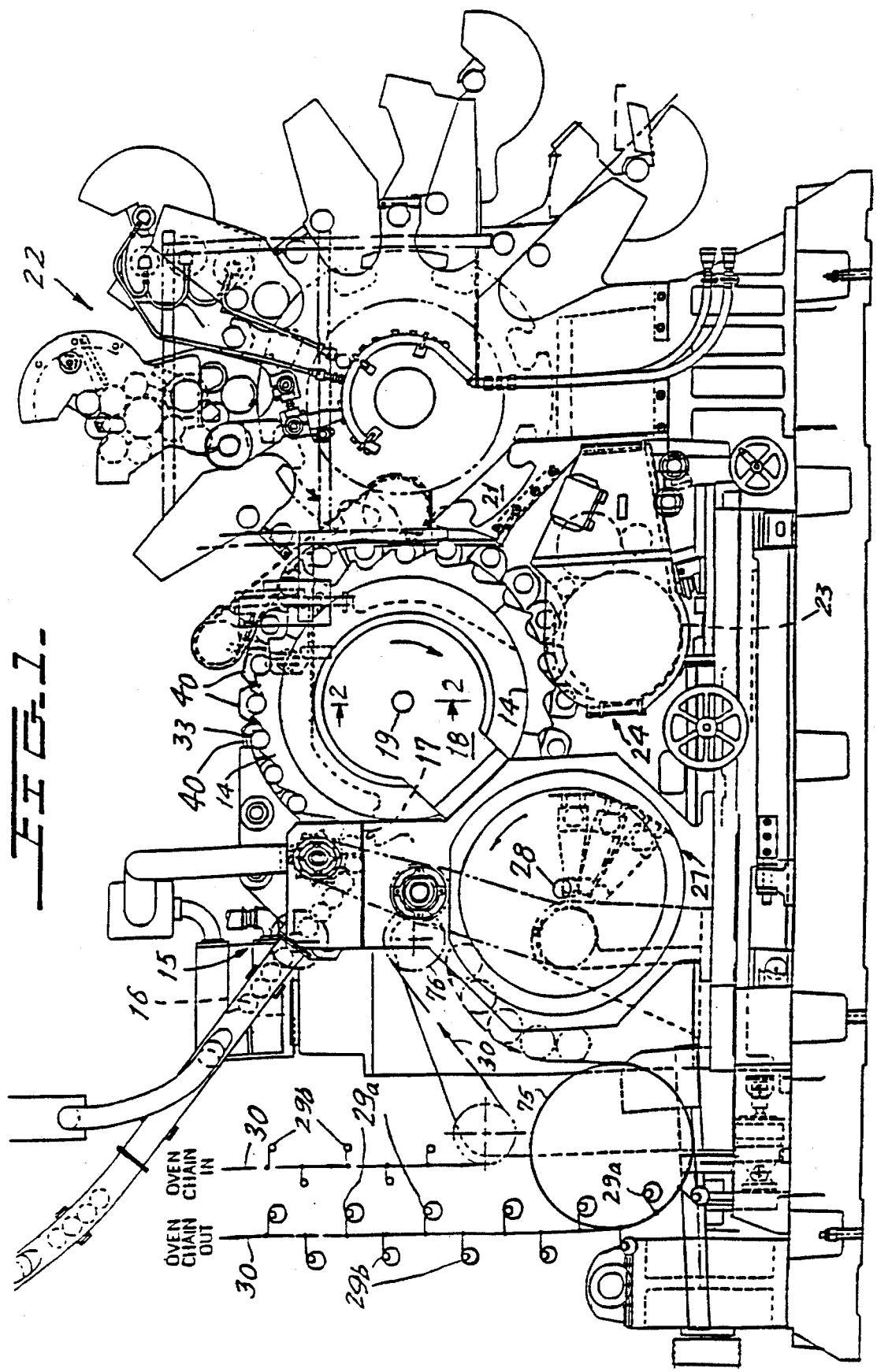
FIG. 1 is a side elevation of a high speed continuous motion can decorator that includes face valve apparatus constructed in accordance with teachings of the instant invention.

As may be desired to amplify the following description, disclosures of the aforesaid U.S. Pat. Nos. 3,766,851, 5,111,742 and 5,183,145, as well as prior art disclosed therein, are incorporated herein by reference. Now referring to the drawings and more particularly to FIG. 1 which illustrates continuous motion cylindrical container, decorating apparatus of the type described in the aforesaid U.S. Pat. No. 5,183,145.

Briefly, the apparatus of FIG. 1 includes infeed conveyor chute 15 which receives undecorated cans 16, each open at one end thereof, from a supply (not shown) and places them in arcuate cradles or pockets 17 along the periphery of aligned spaced arcuate sections 13, 14 (FIG. 2) that are fixedly secured to wheel-like mandrel carrier 18 keyed to horizontal drive shaft 19. Horizontal spindles or mandrels 20, each part of an individual mandrel/actuator subassembly 40. As explained in detail in the aforesaid U.S. Pat. No. 5,111,742, there are a plurality of subassemblies 40 mounted to carrier wheel 18 along periphery 39 thereof, there being equal angular spacing between adjacent subassemblies 40. In a short region extending clockwise or downstream from infeed conveyor 15, each mandrel 20 is in spaced horizontal alignment with an individual pocket 17, and undecorated cans 16 are moved horizontally, being transferred from each cradle 17 to an individual mandrel 20. Suction applied through axial passage 101 extending to the outboard or free end 102 of mandrel 20 draws container 16 to final seating position on mandrel 20.

Each mandrel 20 should be loaded properly with a can 16 by the time mandrel 20 is in the proximity of sensor 33 which detects whether each mandrel 20 contains a properly loaded can 16. In a manner known to the art, if sensor 33 detects that a mandrel 20 is unloaded or is not properly loaded, then as this particular mandrel 20 passes through the decorating zone, wherein printing blanket segments 21 normally engage cans 16 on mandrels 20, this misloaded mandrel 20 is moved to a "no-print" position.

While mounted on mandrels 20, cans 16 are decorated by being brought into engagement with continuously rotating image transfer mat or blanket 21 of the multicolor printing press decorating section indicated generally by reference numeral 22. Thereafter, and while still mounted to mandrels 20, each decorated can 16 is coated with varnish or other protective film applied thereto by engagement with the periphery of applicator roll 23 in the overvarnish unit indicated generally by reference numeral 24. Cans 16 with decorations and protective coatings thereon are then transferred from mandrels 20 to holding elements or pickup devices, constituted by suction cups (not shown), while the latter are in single file along the periphery of transfer wheel 27 in a pickup region located between overvarnish unit 24 and the infeed of cans 16 to pockets 17.

Transfer wheel 27 rotates about shaft 28 as a center and at transfer region cans 16 carried by wheel 27 are deposited on generally horizontal, though upwardly tilted, pins 29a, 29b extending from chain type output conveyor 30. The latter carries cans 16 through an oven (not shown) where the decorations and protective coating on these cans 16 are cured. At opposite ends of the transfer region closed loop chain 30 is guided by relatively large sprockets 75, 76. Between sprockets 75, 76, a plurality of sprockets 77 guide chain 30 in an arcuate path that enables pins 29a, 29b to track the suction devices that hold cans 16 on transfer wheel 27. In a manner known to the art, printing blanket 21, mandrel carrier 18, transfer wheel 27 and chain 30 are driven at speeds that bear predetermined relationships. Typically, there is a common main drive motor (not shown) to which these driven elements are connected mechanically.

Figure 2:
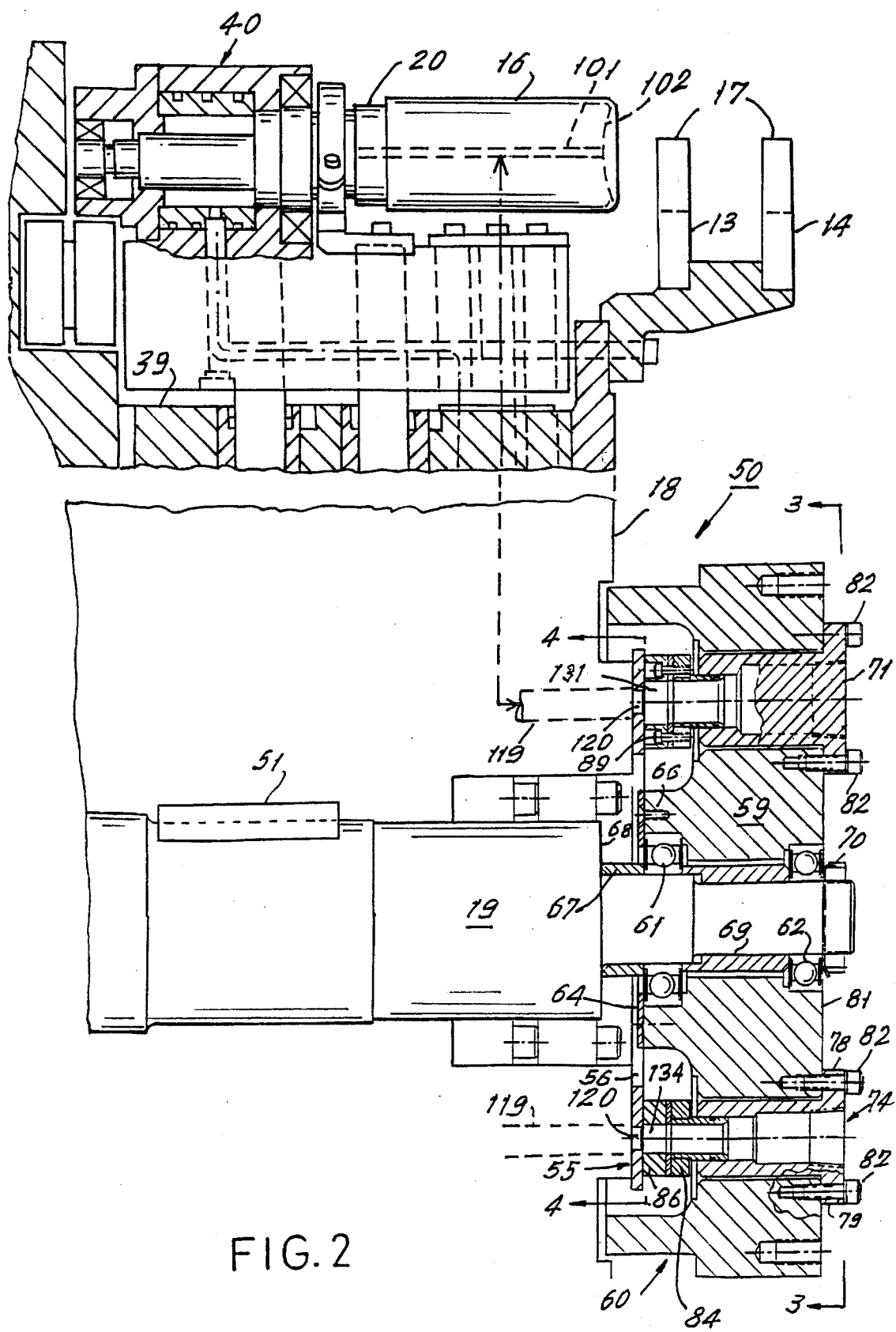
FIG. 2 is a fragmentary cross-section taken through the rotational axis of the mandrel wheel along line 2—2 of FIG. 1 looking in the direction of arrows 2—2.

Now referring more particularly to FIG. 2 wherein face valve apparatus 50 is shown mounted at the rear end of continuously rotating horizontal shaft 19 on which mandrel wheel 18 is mounted. Key 51 provides a rotational drive connection between shaft 19 and wheel 18. Valve apparatus 50 comprises rotating section 55 and stationary section 60 which interface by engaging one another at the planar rear face 56 of a ring-shaped plate which constitutes rotating section 55. The reduced diameter rear end portion of shaft 19 extends through the center of valve section 55, and the latter is fixedly secured to mandrel wheel 18 so as to rotate continuously therewith.

Stationary section 60 includes common support 59 that is fixedly secured to a stationary frame portion of the decorator seen in FIG. 1. Respective inner and outer bearings 61, 62, disposed in central aperture 63 of support 59 and surrounding the rear of shaft 19, rotatably support the latter relative to stationary section 60. Thin ring 64, secured to support 59 by a plurality of screws 66, retains inner bearing 61 on support 59. Stub tube 67, bearing against shoulder 68 of shaft 19, is engaged by the inner race of inner bearing 61 to establish the forward position for stationary section 60. Stub tube 69 establishes the spacing between inner and outer bearings 61, 62. Retainer 70, threadably mounted to the rear of shaft 19, engages outer bearing 62 to maintain the latter in its operative position of FIG. 2.

Figure 3:
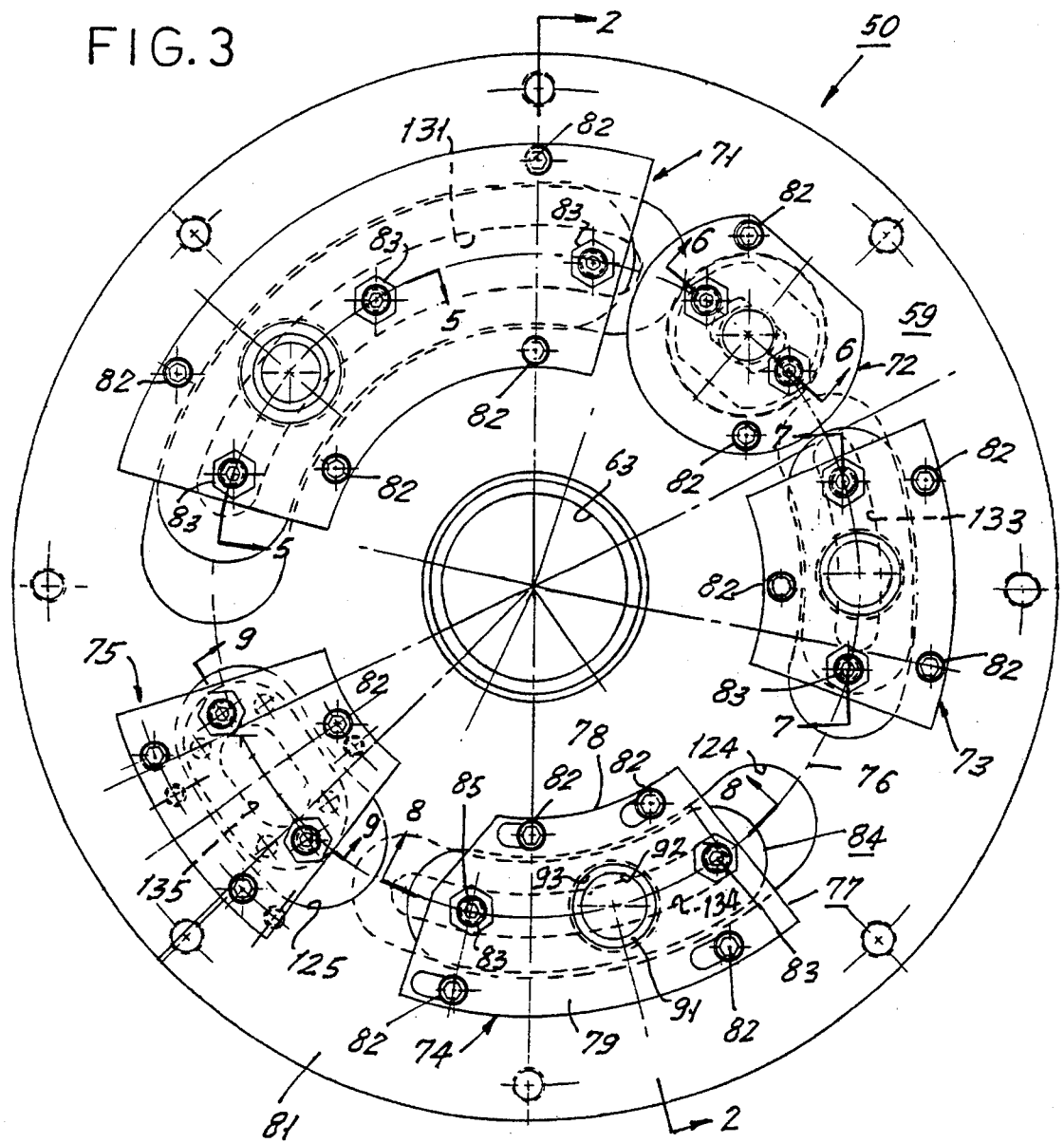
FIG. 3 is a rear elevation of the face valve apparatus, looking in the direction of arrows 3—3 of FIG. 2.
Figure 10:
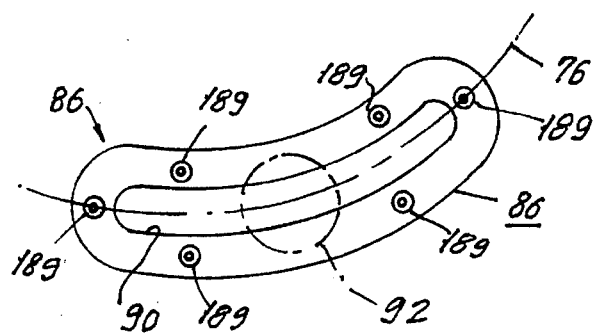
FIG. 10 is a front elevation of a wear pad at one of the stationary valve stations, looking in the direction of arrows 10—10 of FIG. 8.

As seen in FIG. 3 five valve stations 71–75 are mounted on common support 59 in a circular array about aperture 63 as a center. In principle, stations 71–75 have the same constructions, the differences between them being dictated by the angular extent of the respective stations 71–75. This angular extent is measured along circle 76 that is coaxial with aperture 63.

Now referring more particularly to FIGS. 2, 3, 8 and 10 for construction details of station 74 which includes body 77 having arcuate mounting lips 78, 79 projecting radially inward and outward respectively at the rear of body 77 and resting against the rear surface 81 of common support 59. Two bolts 82 extend through clearance apertures in each of the lips 78, 79 and are received by threaded apertures in support 59 to fixedly secure station 74 to support 59. For the most part, body 77 is disposed within arcuate aperture 124 that extends through support 59. Valve station 74 also includes pad subassembly 84 that is mounted to body 77 at the rear thereof by two adjusting screws 83, 83.

The most forward element comprising subassembly 84 is wear pad 86 (FIG. 10) that is secured to backing member 87 by a plurality of screws 89 (FIG. 2). Thin metal sheet 88, interposed between member 87 and pad 86, is positioned to retain the enlarged feet of pressure pads 188 within recesses of backing member 87. An individual pressure pad foot is mounted on each adjusting screw 83, at the front end thereof, by a spherical connection which permits such foot to tilt slightly with respect to the axis of screw 83 yet be held firmly against axial movement with respect thereto. The head of each screw 89 is at the front thereof and is disposed within an individual recess formed by the counterbored portion of clearance aperture 189 in pad 86. Screws 89 extend through clearance apertures 189, aligned with apertures in sheet 88 and are received by threaded apertures in backing 87. Pad 86 is in the form of an elongated loop that defines elongated arcuate outlet port 134 which is centered on circle 76.

Axially extending short tubular element 91 is secured to backing 87, extending through an aperture therein which is aligned with aperture 92 in plate 88. The portion of tube 91 to the rear of backing 87 projects into the front end of passage 93 that extends through body 77 from front to rear thereof. O-ring 94 disposed in an annular recess in the outer surface of tube 91 engages the inner surface of passage 93 to provide a seal between tube 91 and body 77. The rear end of through passage 93 is provided with internal threads that receive hollow externally threaded stub 96 that is engaged by fitting 97 to one end of tube or hose 98 through which suction is applied to outlet port 90 of station 74.

Figure 6:
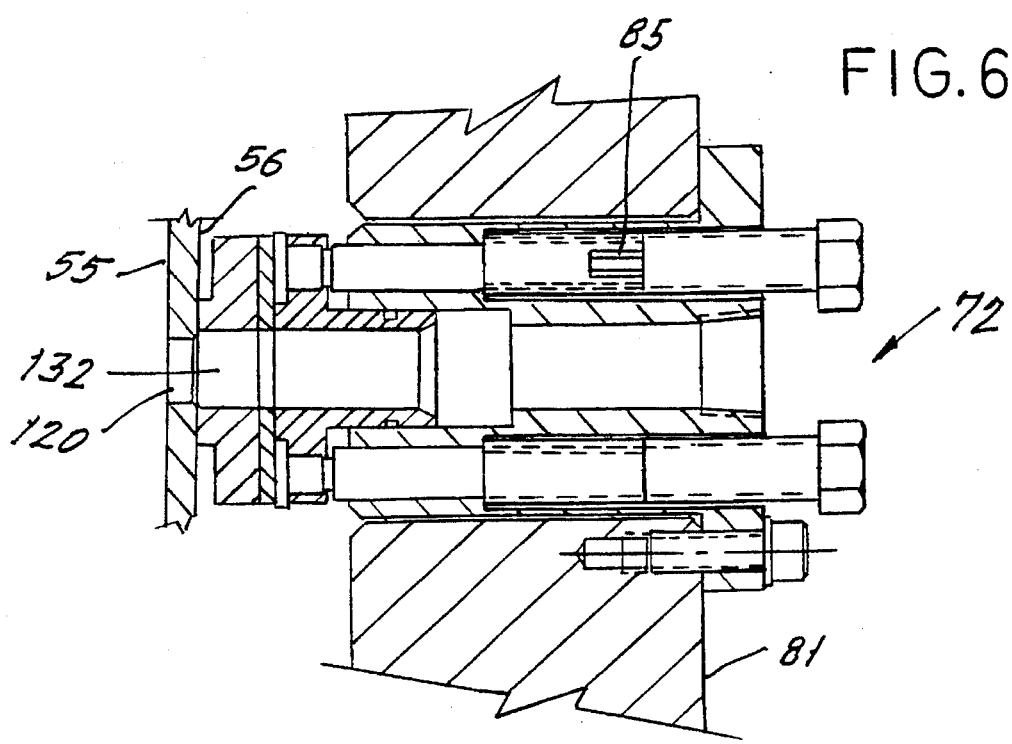
Figure 7:
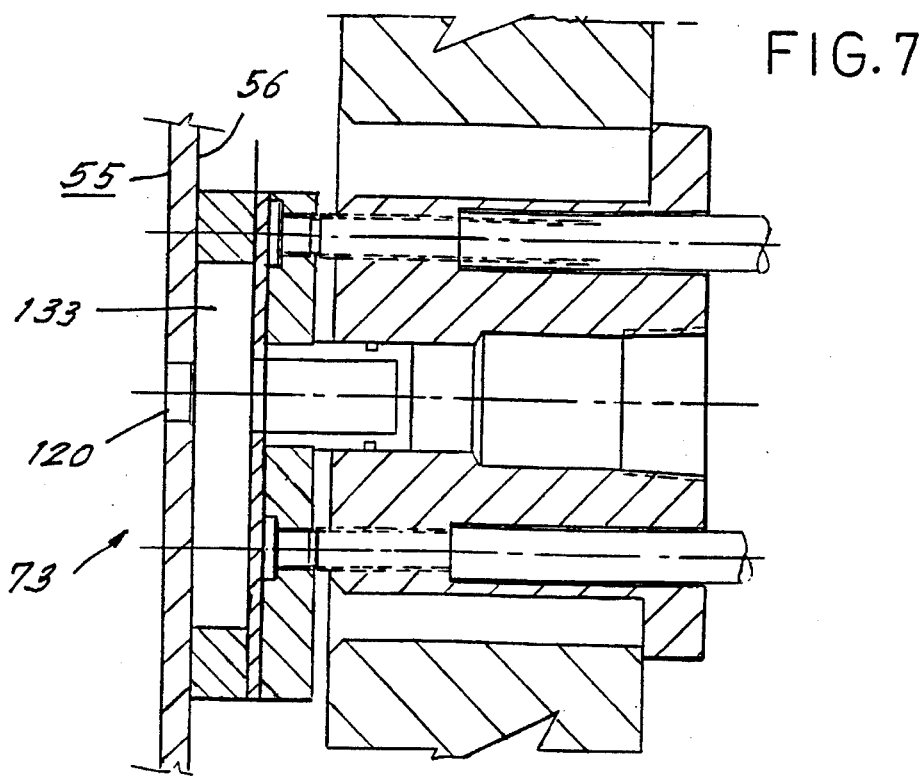
Figure 8:
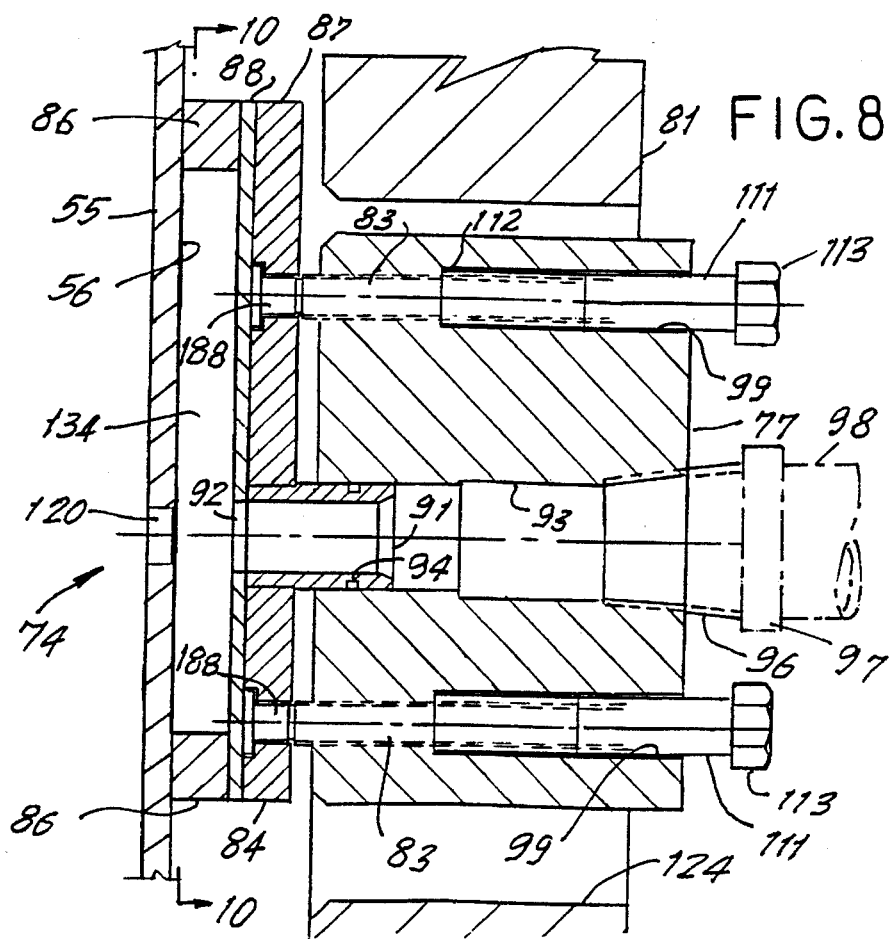

Body 77 is provided with an individual front to rear passage 99 for each of the adjusting screws 83. The front of passage 99 is provided with internal threads that are threadably engaged by screw 83. The rear portion of passage 99 is unthreaded and is of slightly larger diameter than the threaded front portion of passage 99. Locking tube 111 extends into passage 99 at the rear thereof and threadably engages screw 83 at the portion thereof to the rear of shoulder 112 within passage 99. With the front end of tube 111 seated on shoulder 112, adjusting screw 83 is locked against rotation. To unlock screw 83, tube 111 is moved to the rear of shoulder 112, with hexagonal formation 113 at the rear end of tube 111 being provided for this purpose. An Allen wrench is then inserted through the rear end of tube 111 into complementary recess 85 (FIG. 6) at the rear of screw 83 to rotate the latter and thereby move foot 89 either forward or rearward, as required, to properly seat pad 86 on face 56.

Figure 4:
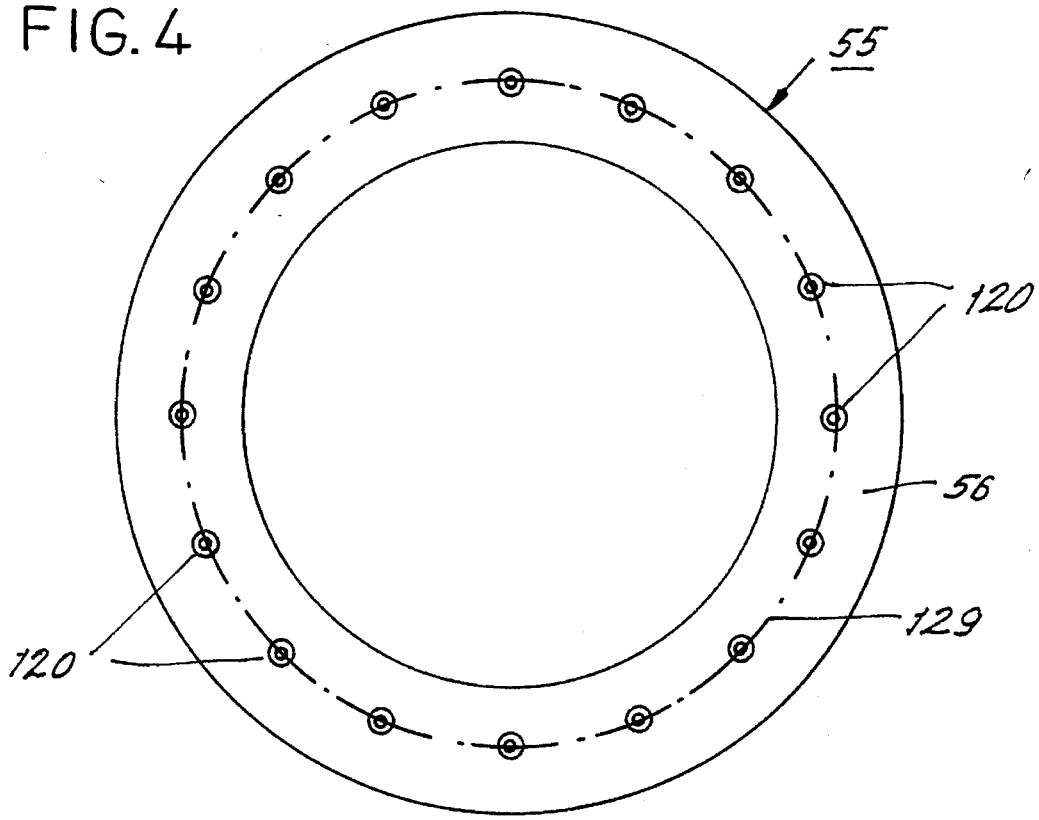
FIG. 4 is a rear elevation of the rotating plate section for the face valve apparatus, looking in the direction of arrows 4—4 of FIG. 2.
Figure 9:
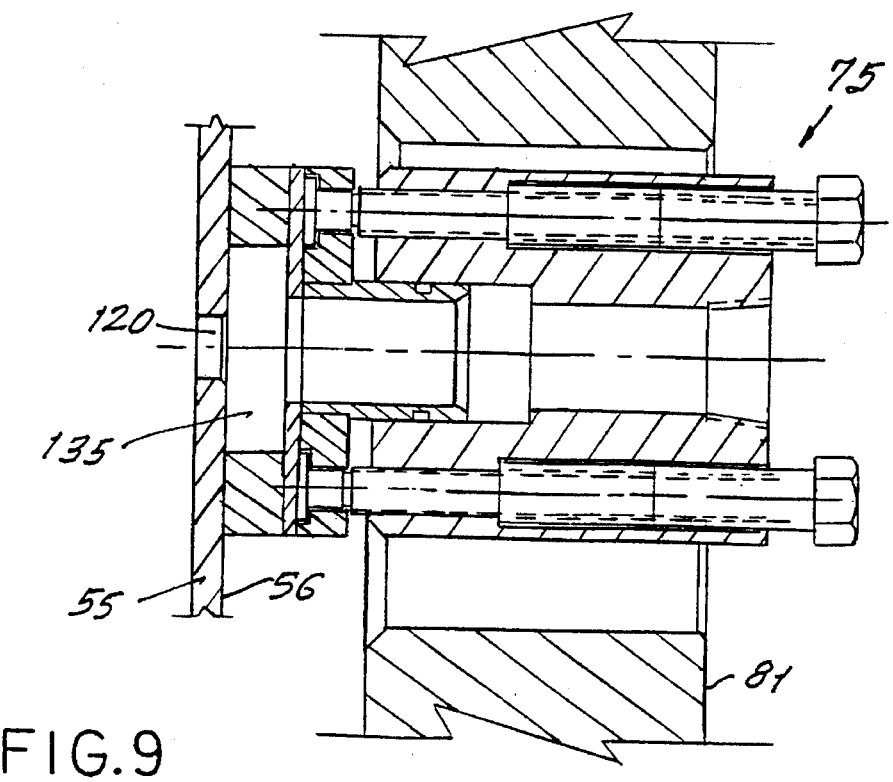
FIGS. 5 through 9 are fragmentary perspectives taken through the respective lines 5—5, 6—6, 7—7, 8—8 and 9—9 of FIG. 3, looking in the directions of the respective arrows 5—5, 6—6, 7—7, 8—8 and 9—9.
Figure 5:
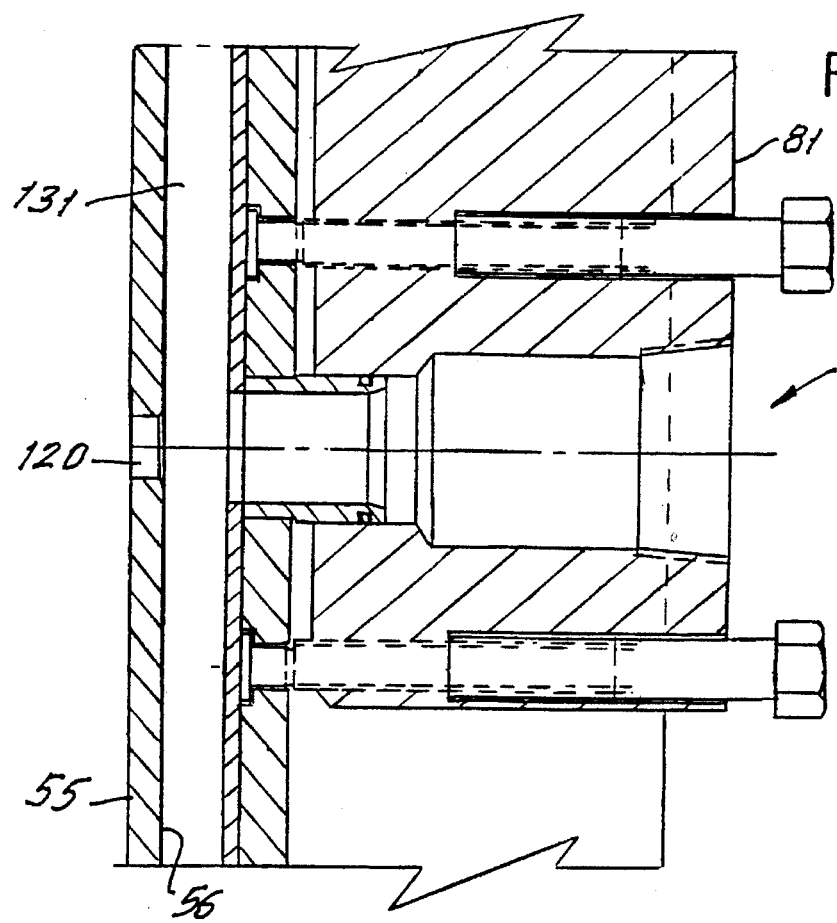

As seen in FIG. 3, outlet ports 131 through 135 of the respective valve stations 71 through 75 are all centered with respect to circle 76. As seen in FIG. 4, a plurality of inlet ports 120 extend through rotating plate 55, there being an individual inlet port 120 connected by an individual conduit formation 119 to an individual one of the mandrels 20, one of which is shown in FIG. 2. Inlet ports 120 extend forward from face 56 and are disposed on circle 129 that is of the same diameter as circle 76 which extends through the centers of outlet ports 131 through 135. Thus, for each revolution of mandrel wheel 18 the individual inlet ports 120 of the continuously rotating valve section 55 will overlap and thereby communicate in succession and directly with outlet ports 131 through 135 to apply working air pressures to that mandrel 20 whose axial passage 101 is connected to an inlet port 120 while it is overlapping one of the outlet ports 131–135.

Each of the stations 72–75 is provided with two adjusting screws 83, and the longest station 71 which is provided with three adjusting screws 83 to assure that all portions of the wear pad that defines outlet 131 is seated uniformly against surface 56. Normally, the number of mounting screws 82 that are required for each of the stations 71–75 depends upon the respective sizes thereof. Thus, the smallest station 72 requires only two mounting screws 82 while each intermediate size station 73 and 75 requires three mounting screws 82 and each of the remaining stations 71 and 74, which are even larger than station 75, requires four mounting screws 82. Similarly, the number of screws 89 that are required for securing an individual wear pad 86 depends upon the size thereof.

In order to dismount station 74 from common support 59 the four mounting screws 82 of station 74 are removed. Then station 74 is moved slightly counterclockwise with respect to FIG. 3 until subassembly 84 (elements 86, 87, 88) is aligned with arcuate aperture 124, and subassembly 84 and the axial portion of body 77 are withdrawn rearward through aperture 124. Before withdrawing subassembly 84 through aperture 124, it may be necessary to disengage fitting 97 from fitting 96. This depends upon the stiffness of supply hose 98 that is connected to station 74.

With a station 74, etc. dismounted from common support 59, screws 89 thereof are accessible for removal to dismount and replace pad 86. While the latter is in sliding engagement with face 56 of rotating ring plate 55, essentially all wear takes place at pad 86 in that it is not as hard as face 56.

Typically, ring plate 55 is constructed of a hardened ferrous material while pad 86 is constructed of hard synthetic material (i.e. plastics) which is not nearly as hard as the material of ring plate 55.

It should now be apparent to those skilled in the art that vacuum (air pressure below ambient) is applied at station 71 for loading undecorated cans 16 on mandrels 20, air pressure above ambient is applied at station 72 when sensor 33 detects that a can 16 has been misloaded, vacuum is applied at station 73 to securely hold can 16 on mandrel 20 during decorating of the former, vacuum is also applied at station 74 to maintain good seating of can 16 on mandrel 20 during the application of an overvarnish coat, and finally, at station 75 air pressure above ambient is applied to unload fully decorated can 16 from mandrel 20.

While station 75 is illustrated herein as being fixedly secured to common support 59, it should now be apparent to those skilled in the art that mounting of a station at the location of station 75 may permit limited motion thereof within aperture 125 and along circle 76, so that the unloading point for a decorated container 16 may be adjusted by an electronically controlled drive as a function of the rotational speed for mandrel wheel 18 for the purpose described in the aforesaid U.S. Pat. No. 5,183,145. Thus, in the following claims reference to a valve station as being relatively stationary shall include not only a rigid connection, as illustrated in the drawings hereof, but also a connection that permits limited adjustment of the valve station as a function of the rotational speed for the mandrel wheel 18. Also, references in the claims hereof to pressurized air shall mean working air at a pressure substantially different than ambient pressure whether that pressure constitutes a vacuum or is substantially greater (higher) than ambient.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. High speed equipment for handling and applying decorations to bodies of cylindrical containers, said equipment including:

a decorating section for decorating bodies of cylindrical containers as they move in operative engagement with said decorating section;

a wheel continuously rotating on a main axis, a plurality of mandrels extending parallel to said main axis and mounted on said wheel adjacent its periphery, said mandrels carrying said bodies while decorations are applied thereto by said decorating section;

face valve apparatus including a first section operatively mounted for continuous rotation about said main axis in unison with said wheel and having a planar face perpendicular to said main axis, a relatively stationary second section rearward of said face and confronting same;

said second section including a plurality of valve stations, and a fixed common support on which said valve stations are mounted;

each of said valve stations including a replaceable pad adjacent said face defining an outlet port in front of said support, fasteners removably securing said valve station to said support and accessible from behind said support for operation to selectively secure and release mounting of each of said valve stations with said support without disturbing mounting of any others of said valve stations and without moving said support relative to said first section, and an opening in said support through which said pad is movable rearward of said support where said pad is accessible for replacement thereof;

a plurality of inlet ports at said face and disposed offset radially from said axis, conduit means connecting each of said mandrels to an individual one of said inlet ports, said inlet ports being operatively positioned so that for part of each revolution of said first section each of said inlet ports communicates in succession directly with each of said outlet ports whereby working air that is applied to each of said valve stations at its rear appears at said mandrels.

2. Equipment as defined in claim 1 wherein said plurality of valve stations comprise at least four valve stations.

3. Face valve apparatus including:

a first section mounted for continuous rotation about a main axis and including a planar face perpendicular to said main axis;

a relatively stationary second section rearward of said face and confronting same;

said second section including at least one valve station, and a fixed support on which said at least one valve station is mounted;

a first valve station of said at least one valve station including a replaceable pad adjacent said face defining an outlet port in front of said fixed support, fasteners removably securing said first valve station to said fixed support and accessible from behind said support for operation to selectively secure and release mounting of said first valve station with said fixed support, and an opening in said fixed support through which said pad is movable rearward of said fixed support where said pad is accessible for replacement thereof;

a plurality of inlet ports at said face and disposed offset radially from said axis, said inlet ports being operatively positioned so that for part of each revolution of said first section each of said inlet ports communicates directly with said outlet port whereby working air that is applied to said valve station at its rear appears at said inlet ports.

4. Face valve apparatus as defined by claim 3 in which the first valve station also includes adjusting elements extending rearward from said pad and operable from behind said fixed support to adjust engagement force between said pad and said face.

5. Face valve apparatus as defined by claim 4 in which the first valve station also includes a backing behind said pad and pad fasteners to selectively secure mounting and release of said pad with said backing, said pad fasteners being accessible for operation when said pad is rearward of said fixed support.

6. Face valve apparatus as defined by claim 5 in which said first valve station also includes a body behind said backing, said adjusting elements securing said pad and said backing to said body, and said body being extended into said opening when said first valve station is operatively secured to said support.

7. Face valve apparatus as defined by claim 6 in which there is a conduit extending front to back through said body, a stub tube communicating with said outlet port, extending rearward from said backing into said conduit to form a telecopier connection therewith.

8. Face valve apparatus as defined by claim 7 in which there is a fitting on said body for connecting a line that supplies working air to said conduit at its rear end.

9. Face valve apparatus as defined by claim 6 in which said body at its rear includes transverse lips through which said fasteners extend to secure said first valve station to said fixed support.

10. Face valve apparatus as defined by claim 9 in which said transverse lips engage said fixed support at its rear surface.

11. Face valve apparatus including:

a first section mounted for continuous rotation about a main axis and including a planar face perpendicular to said main axis;

a relatively stationary second section rearward of said face and confronting same;

said second section including a plurality of valve stations, and a fixed common support on which said valve stations are mounted;

each of said valve stations including a replaceable pad adjacent said face defining an outlet port in front of said support, fasteners removably securing said valve station to said support and accessible from behind said support for operation to selectively secure and release mounting of each of said valve stations with said support without disturbing mounting of any others of said valve stations and without moving said support relative to said first section, and an opening in said support through which said pad is movable rearward of said support where said pad is accessible for replacement thereof;

a plurality of inlet ports at said face and disposed offset radially from said axis, said inlet ports being operatively positioned so that for part of each revolution of said first section each of said inlet ports communicates in succession directly with each of said outlet ports whereby working air that is applied to each of said valve stations at its rear appears at said inlet ports.

12. Face valve apparatus as defined by claim 11 wherein said plurality of valve stations comprise at least four valve stations.

* * * * *